United States Patent Office 2,748,131
Patented May 29, 1956

2,748,131

STABILIZATION OF POLYMERIZABLE HETEROCYCLIC NITROGEN COMPOUNDS

Warren L. Smith and Mack F. Potts, Bartlesville, Okla., and Paul S. Hudson, Iowa City, Iowa, assignors to Phillips Petroleum Company, a corporation of Delaware No Drawing. Application November 3, 1952,
Serial No. 318,514

13 Claims. (Cl. 260—290)

This invention relates to the stabilization of polymerizable compounds. In one of its aspects this invention relates to the stabilization of polymerizable heterocyclic nitrogen compounds under storage and handling conditions, and during distillation, or at elevated temperatures. In another of its more specific aspects, this invention relates to a method for preventing loss of heterocyclic nitrogen compounds due to polymerization.

It is well-known that unsaturated, polymerizable heterocyclic nitrogen compounds tend to polymerize during storage and various handling conditions, especially during distillation, and consequently yield and recovery of these compounds are often times considerably diminished due to this unwanted and undesirable polymerization. Also, besides reducing yields and recovery of these polymerizable heterocyclic nitrogen compounds, often the polymerized material adversely affects the reaction wherein these polymerizable compounds are employed as reactants, as well as the products which are derived from these reactions.

Each of the objects of this invention will be obtained by at least one of the aspects of this invention.

It is an object of this invention to prevent and/or inhibit the polymerization of polymerizable heterocyclic nitrogen compounds during storage and other handling situations. It is another object of this invention to inhibit the polymerization of these materials at elevated temperatures and especially during distillation. It is another object of this invention to provide polymerization inhibited compositions comprising a polymerizable heterocyclic nitrogen compound. Yet another object of this invention is to provide a polymerization inhibited composition comprising a vinyl-substituted pyridine.

Other and further objects and advantages of this invention will be apparent to those skilled in the art upon study of the accompanying disclosure.

In accordance with this invention, we have found that these heterocyclic nitrogen compounds can be stabilized against polymerization by addition thereto of a naphthylamine sulfonic acid. Certain naphthylamine sulfonic acids, i. e., those which contain either one or two amino groups in the 1 and/or 2 positions in the naphthalene structure and either one or two —SO₃H groups in one and/or two of the 5, 6, 7, and 8 positions of the naphthalene structure, such as 1-naphthylamine-5-sulfonic acid are effective stabilizers. It has also been found that compounds of similar type, but with the amino and sulfonic acid groups in different positions in the molecule with respect to each other, such as 2-naphthylamine-1-sulfonic acid, are ineffective as stabilizers or polymerization inhibitors for these heterocyclic nitrogen compounds.

Naphthylamine sulfonic acids which are applicable are compounds which can be represented by the formula

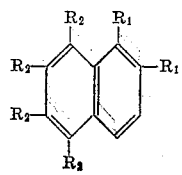

wherein R₁ is selected from the group consisting of hydrogen or amino groups and with at least one R₁ being an amino group, and R₂ is selected from the group consisting of hydrogen or —SO₃H groups and with at least one but not more than two —SO₃H groups being present. Examples of compounds which are applicable include 1-naphthylamine-5-sulfonic acid, 2-naphthylamine-5-sulfonic acid, 1-naphthylamine-5,6-disulfonic acid, 1,2-diaminonaphthalene-5,6-disulfonic acid, and 2-naphthylamine-6-sulfonic acid.

These naphthylamine sulfonic acids are effective as polymerization inhibitors over a wide range of temperatures from below and about 40° F. up to and about 400° F. The amount of the stabilizing agent which need be added to inhibit polymerization varies with the type of polymerizable heterocyclic nitrogen compound to be inhibited and the time and temperature under which it is desired to effect stabilization. Often a trace of the naphthylamine sulfonic acid is sufficient to prevent undesired polymerization. We usually use an amount in the range of 0.001 to 5.0 per cent by weight, preferably from 0.05 to 1.0 per cent by weight, based on the amount of the polymerizable heterocyclic nitrogen compound. Larger amounts, even as much as 10 per cent by weight and higher can be used if desired, although under most circumstances this is not necessary. These stabilizing agents are effective in anhydrous systems as well as in systems where water is present.

These naphthylamine sulfonic acids, in order to be especially effective, should preferably be in intimate contact with the material to be stabilized. As these naphthylamine sulfonic acids are, in general, only slightly soluble in the polymerizable heterocyclic nitrogen compounds, they are generally added as fine powders after which the mixture is stirred and/or warmed. The stabilizing agent may be added batchwise or continuously as the heterocyclic nitrogen compound is produced.

The recovery of the naphthylamine sulfonic acids from the polymerizable heterocyclic nitrogen compounds with which it is admixed is relatively simple and easily effected. After storage, handling, or shipment of the stabilized material, the stabilizing agent can be easily and readily separated and recovered either by distillation, preferably under reduced pressure, or by any other convenient method.

The polymerizable heterocyclic nitrogen compounds which can be inhibited against polymerization by these naphthylamide sulfonic acids in accordance with this invention include the polymerizable heterocyclic nitrogen compounds of the pyridine and quinoline (including isoquinoline) series and the nuclear (ring) alkyl-substituted derivatives thereof. These polymerizable heterocyclic nitrogen compounds are those containing a

group where R is a hydrogen atom or a methyl group. One or two vinyl groups may be present, and also alkyl groups may be present attached to the ring as long as there are not more than 12 carbon atoms in these alkyl groups. Typical heterocyclic nitrogen compounds which are applicable in the practice of this invention include the vinyl substituted pyridines and the vinyl-substituted quinolines such as 2-vinylpyridine, 5-methyl-2-vinylpyridine, 5-ethyl-2-vinylpyridine, 2-methyl-5-vinylpyridine, 2,5-divinylpyridine, 3-methyl-2,5-divinylpyridine, 4-methyl-3-vinylpyridine, 2-isopropenylpyridine, 5-propyl-2-isopropenylpyridine, 2-octyl-5-vinylpyridine, 2-vinylquinoline, 8-ethyl-2-vinylquinoline, 4-hexyl-5-vinylquinoline, 1-vinylisoquinoline, 5-methyl-1-isopropenylisoquinoline, 1,8-divinylisoquinoline, 2,5-divinylquinoline, 6,7-dimethyl-2,5-divinylquinoline, etc. Generally, as indicated, any polymerizable nitrogen compound such as vinyl substituted pyridines, quinolines or isoquinolines are applicable in the practice of this invention. Other polymerizable heterocyclic nitrogen compounds which can be stabilized by following the teaching of this invention include the

substituted (R as defined above) piperidines (hexahydropyridines), pyrroles, pyrrolidines, especially the vinyl-substituted piperidines, pyrroles, pyrrolidines, the dihydro- and the tetrahydropyridines and their alkyl derivatives. Other materials such as N-vinylpyrrolidone and 9-vinylcarbazole (N-vinyl) can be used in the practice of this invention.

The following specific examples set forth hereinafter are illustrative of this invention and specific details for operating the present invention are described with comparative results showing the improvement obtained by this invention. However, as indicated, these examples are merely illustrative and not limitative of this invention.

Example I

A run was made using 1-naphthylamine-5-sulfonic acid as an inhibitor for the polymerization of 2-methyl-5-vinylpyridine by adding 0.3 per cent by weight of this compound to 2-methyl-5-vinylpyridine and heating the mixture in an atmosphere of nitrogen for 24 hours at 185° F. The unreacted 2-methyl-5-vinylpyridine was removed by vacuum distillation at a pressure less than 1 mm. Hg. The polymer which remained was weighed and the per cent 2-methyl-5-vinylpyridine polymerized was calculated. A second run was made in which no additive was present. The following results were obtained:

| Additive | Percent 2-Methyl-5-Vinylpyridine Polymerized |
| --- | --- |
| 1-Naphthylamine-5-sulfonic acid | 2.18 |
| None | 23.0 |

One run was made using 2-naphthylamine-1-sulfonic acid as a polymerization inhibitor for 2-methyl-5-vinylpyridine using 0.3 weight per cent of the additive based on the 2-methyl-5-vinylpyridine. The mixture was heated in an atmosphere of nitrogen for 24 hours at 200° F. 2-naphthylamine-1-sulfonic acid is ineffective as a polymerization inhibitor as evidenced by the fact that the sample became very viscous and was similar in appearance to a run in which 2-methyl-5-vinylpyridine was heated under similar conditions in the absence of an additive.

Example II

A run was made similar to those in Example I using 2-naphthylamine-5-sulfonic acid as a polymerization inhibitor in a sample of 2-methyl-5-vinylpyridine containing 5 per cent by weight of water. The result was as follows:

| Additive | Percent 2-Methyl-5-Vinylpyridine Polymerized |
| --- | --- |
| 2-Naphthylamine-5-sulfonic acid | 3.94 |

As many possible embodiments may be made of this invention without departing from the scope thereof, it is to be understood that all matter herein set forth is to be interpreted as illustrative and not in a limiting sense.

We claim:

1. A polymerizable heterocyclic nitrogen base selected from the group consisting of compounds having the formula

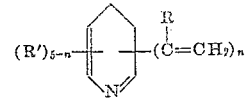

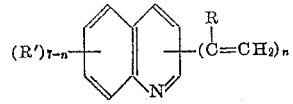

and

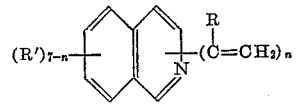

where $n$ is an integer selected from the group consisting of 1 and 2, R is selected from the group consisting of H and $CH_3$, and R' is selected from the group consisting of H and alkyl groups, not more than 12 carbon atoms being present in the total of said R' groups, said heterocyclic nitrogen base being stabilized by the addition of a stabilizing amount of a naphthylamine sulfonic acid selected from the group consisting of compounds having the formula

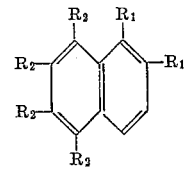

wherein $R_1$ is selected from the group consisting of hydrogen and amino groups, at least one $R_1$ being an amino group, and $R_2$ is selected from the group consisting of hydrogen and $-SO_3H$ groups, at least one and not more than two $-SO_3H$ groups being present.

2. A polymerizable heterocyclic nitrogen base selected from the group consisting of compounds having the formula

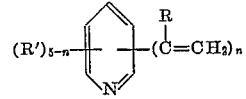

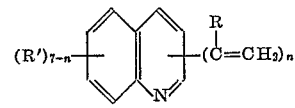

and

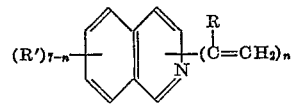

where $n$ is an integer selected from the group consisting of 1 and 2, R is selected from the group consisting of H and $CH_3$, and R' is selected from the group consisting of H and alkyl groups, not more than 12 carbon atoms being present in the total of said R' groups, said heterocyclic nitrogen base being stabilized by the addition of from 0.001 to 5.0 per cent by weight of a naphthylamine sulfonic acid selected from the group consisting of compounds having the formula

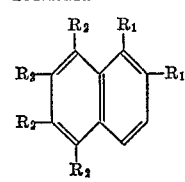

wherein $R_1$ is selected from the group consisting of hydrogen and amino groups, at least one $R_1$ being an amino group, and $R_2$ is selected from the group consisting of hydrogen and —$SO_3H$ groups, at least one and not more than two —$SO_3H$ groups being present.

3. 2-methyl-5-vinylpyridine stabilized by the addition of a stabilizing amount of a naphthylamine sulfonic acid selected from the group consisting of compounds having the formula

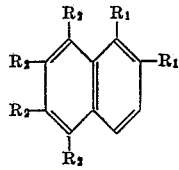

wherein $R_1$ is selected from the group consisting of hydrogen and amino groups, at least one $R_1$ being an amino group, and $R_2$ is selected from the group consisting of hydrogen and —$SO_3H$ groups, at least one and not more than two —$SO_3H$ groups being present.

4. 2-methyl-5-vinylpyridine stabilized by the addition of from 0.001 to 5.0 per cent by weight of a naphthylamine sulfonic acid selected from the group consisting of compounds having the formula

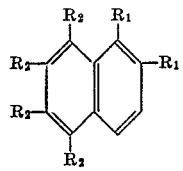

wherein $R_1$ is selected from the group consisting of hydrogen and amino groups, at least one $R_1$ being an amino group, and $R_2$ is selected from the group consisting of hydrogen and —$SO_3H$ groups, at least one and not more than two —$SO_3H$ groups being present.

5. 2-methyl-5-vinylpyridine stabilized by the addition of 0.001 to 5.0 per cent by weight of 1-napthylamine-5-sulfonic acid.

6. 2-methyl-5-vinylpyridine stabilized by the addition of 0.001 to 5.0 per cent by weight of 2-naphthylamine-5-sulfonic acid.

7. 2-vinylpyridine stabilized by the addition of a stabilizing amount of a naphthylamine sulfonic acid selected from the group consisting of compounds having the formula

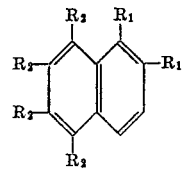

wherein $R_1$ is selected from the group consisting of hydrogen and amino groups, at least one $R_1$ being an amino group, and $R_2$ is selected from the group consisting of hydrogen and —$SO_3H$ groups, at least one and not more than two —$SO_3H$ groups being present.

8. 2-vinylpyridine stabilized by the addition of from 0.001 to 5.0 per cent by weight of a naphthylamine sulfonic acid selected from the group consisting of compounds having the formula

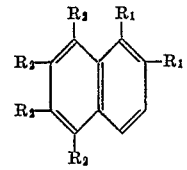

wherein $R_1$ is selected from the group consisting of hydrogen and amino groups, at least one $R_1$ being an amino group, and $R_2$ is selected from the group consisting of hydrogen and —$SO_3H$ groups, at least one and not more than two —$SO_3H$ groups being present.

9. A process for inhibiting the polymerization of a compound selected from the group consisting of compounds having the formula

and

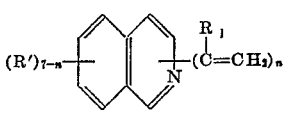

where $n$ is an integer selected from the group consisting of 1 and 2, R is selected from the group consisting of H and $CH_3$, and R' is selected from the group consisting of H and alkyl groups, not more than 12 carbon atoms being present in the total of said R' groups, which comprises adding to said compound a polymerization inhibiting amount of a naphthylamine sulfonic acid selected from the group consisting of compounds having the formula

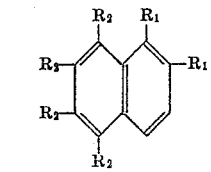

wherein $R_1$ is selected from the group consisting of hydrogen and amino groups, at least one $R_1$ being an amino group, and $R_2$ is selected from the group consisting of hydrogen and —$SO_3H$ groups, at least one and not more than two —$SO_3H$ groups being present.

10. A process for inhibiting the polymerization of 2-methyl-5-vinylpyridine which comprises adding to said 2-methyl-5-vinylpyridine from 0.001 to 5 per cent by weight of a naphthylamine sulfonic acid selected from the group consisting of compounds having the formula

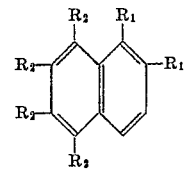

wherein $R_1$ is selected from the group consisting of hydrogen and amino groups, at least one $R_1$ being an amino group, and $R_2$ is selected from the group consisting of hydrogen and —$SO_3H$ groups, at least one and not more than two —$SO_3H$ groups being present.

11. A process for inhibiting the polymerization of 2-vinylpyridine which comprises adding to said 2-vinylpyridine from 0.001 to 5 per cent by weight of a naphthylamine sulfonic acid selected from the group consisting of compounds having the formula

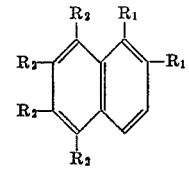

wherein $R_1$ is selected from the group consisting of hydrogen and amino groups, at least one $R_1$ being an amino group, and $R_2$ is selected from the group consisting of hydrogen and —SO₃H groups, at least one and not more than two —SO₃H groups being present.

12. A process for inhibiting the polymerization of 2-methyl-5-vinylpyridine which comprises adding to said 2-methyl-5-vinylpyridine from 0.001 to 5.0 per cent by weight of 1-naphthylamine-5-sulfonic acid.

13. A process for inhibiting the polymerization of 2-methyl-5-vinylpyridine which comprises adding to said 2-methyl-5-vinylpyridine from 0.001 to 5.0 per cent by weight of 1-naphthylamine-5-sulfonic acid.

References Cited in the file of this patent

UNITED STATES PATENTS

| | | |
|---|---|---|
| 2,512,660 | Mahan | June 27, 1950 |
| 2,556,845 | Kauffman | June 12, 1951 |
| 2,592,625 | Wagner | Apr. 15, 1952 |

OTHER REFERENCES

Alekeenko: Chem. Abst., vol. 40, col. 2675 (1946).
Frank et al.: JACS, vol. 68, p. 908 (1946).